United States Patent
Kuragaki et al.

(10) Patent No.: US 6,505,107 B2
(45) Date of Patent: Jan. 7, 2003

(54) VEHICLE TRAVEL CONTROL APPARATUS

(75) Inventors: Satoru Kuragaki, Hitachi (JP); Jiro Takezaki, Hitachinaka (JP); Kimio Nishino, Hitachinaka (JP); Toshimichi Minowa, Mito (JP); Tokuji Yoshikawa, Hitachi (JP); Yoshinori Endo, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/092,445

(22) Filed: Mar. 8, 2002

(65) Prior Publication Data

US 2002/0099484 A1 Jul. 25, 2002

Related U.S. Application Data

(63) Continuation of application No. 09/763,770, filed on Apr. 20, 2001, now Pat. No. 6,381,524.

(30) Foreign Application Priority Data

Jun. 20, 2000 (WO) .............................. PCT/JP00/04010

(51) Int. Cl.⁷ .................................................. G06F 7/00
(52) U.S. Cl. ...................... 701/36; 701/200; 340/286.1; 73/178 R
(58) Field of Search .............................. 701/36–200, 24, 701/35; 73/178 R; 340/286.01

(56) References Cited

U.S. PATENT DOCUMENTS

| 5,657,226 A | * | 8/1997 | Shin et al. ..................... 701/23 |
| 5,774,069 A | | 6/1998 | Tanaka et al. |
| 5,838,562 A | * | 11/1998 | Gudat et al. ................. 701/213 |
| 5,889,476 A | | 3/1999 | Schmitz |
| 6,076,041 A | * | 6/2000 | Watanabe ..................... 701/211 |
| 6,269,303 B1 | * | 7/2000 | Watanabe et al. ........... 701/209 |
| 6,115,669 A | * | 9/2000 | Watanabe et al. ........... 701/209 |
| 6,144,318 A | * | 11/2000 | Hayashi et al. ............. 340/995 |
| 6,173,277 B1 | * | 1/2001 | Ashby et al. .................. 707/1 |
| 6,175,917 B1 | * | 1/2001 | Arrow et al. .................. 713/1 |
| 6,202,026 B1 | * | 3/2001 | Nimura et al. ............... 701/211 |
| 6,233,515 B1 | * | 5/2001 | Engelman et al. .......... 180/169 |
| 6,263,276 B1 | * | 7/2001 | Yokoyama et al. ......... 701/207 |
| 6,282,490 B1 | * | 8/2001 | Nimura et al. ............... 701/208 |
| 6,289,276 B1 | * | 9/2001 | Ahrens et al. ............... 701/200 |
| 6,381,524 B1 | * | 4/2002 | Kuragaki et al. ....... 340/286.01 |

FOREIGN PATENT DOCUMENTS

| JP | 2-184925 | 7/1990 |
| JP | 6-251294 | 9/1994 |
| JP | 8-194894 | 7/1996 |

* cited by examiner

Primary Examiner—William A. Cuchlinski, Jr.
Assistant Examiner—Olga Hernandez
(74) Attorney, Agent, or Firm—Crowell & Moring LLP

(57) ABSTRACT

A vehicle travel control apparatus includes a radar sensor, a vehicle speed controller, a hydraulic pump, a proportional solenoid valve and a brake controller. When the vehicle speed controller judges a braking situation based on information from the radar sensor, the brake controller actuates the hydraulic pump and the proportional solenoid valve based on a command from the vehicle speed controller, and controls a braking torque of wheels.

3 Claims, 11 Drawing Sheets

VEHICLE TRAVEL CONTROL APPARATUS

This application is a continuation of application Ser. No. 09/763,770, filed Apr. 20, 2001 U.S. Pat. No. 6,381,524.

TECHNICAL FIELD

The present invention relates to a vehicle travel control apparatus, and more particularly, to a vehicle travel control apparatus suitable to control a distance between vehicles and a vehicle speed.

BACKGROUND ART

Conventional vehicle travel control apparatuses measure, for example, a distance between a one' vehicle and a vehicle traveling ahead and control a degree of opening of a throttle valve or a brake so that the distance between the vehicles is kept constant in accordance with the vehicle speed of the one's own vehicle. Further, the vehicle travel control apparatuses control a degree of opening of the throttle valve or the brake so that the one's own vehicle keeps a constant vehicle speed.

DISCLOSURE OF INVENTION

However, it has become apparent that when a vehicle was actually traveled on a road using the conventional vehicle travel control apparatuses, the control performance of the apparatuses were lowered depending upon a state of the road. For example, when a road was curved or began to ascend, the conventional vehicle travel control apparatuses started to control a distance between vehicles and a vehicle speed after they detected a change of state of the road based on a change of a vehicle speed, and the like, which caused a time lag until a proper control was actually executed because the start of control was delayed. As a result, it has become apparent that a problem arose in that the conventional vehicle travel control apparatuses could not smoothly control a vehicle. For example, when a vehicle comes to an upward slope, the speed of the vehicle is reduced and the apparatuses increase the speed of the vehicle after they detect the reduction of the speed, which sometimes makes it difficult to keep the vehicle at a constant speed. In particular, as the slope of a road is more steep, a response is more delayed. Further, while a vehicle must reduce a speed when it makes a turn, a time lag is caused until the speed is actually reduced.

To cope with the above problems, the inventors examined a system for improving the controllability of a vehicle control apparatus by predicting a change of state of a road making use of data of curves and slopes stored in position information displays which are typically a car navigator. For this purpose, the inventors examined a system for associating a position information display with a vehicle control apparatus and for sharing the information of the respective apparatuses. When the information of the plurality of apparatuses having a different function was shared, the inventors examined a system for simultaneously sharing the information using serial communication to reduce the number of communication lines that connect the plurality of apparatuses.

However, when the serial communication is used to share the information of the plurality of apparatuses, a task is necessary to share the information. In particular, it has become apparent that the quantity of information to be shared is increased in a system which aims at the provision of a high-grade drive support system, and thus when the serial communication is used in the system, it is difficult to execute a control while sharing the information because a communication task becomes longer than the tasks which are necessary to realize the intrinsic functions of the respective apparatuses.

Accordingly, an object of the present invention is to provide a vehicle control apparatus which makes it possible to share information by a plurality of apparatuses and by which controllability can be improved.

(1) To achieve the above object, the present invention includes a plurality of operating systems, an OS switching means for switching the plurality of operating systems, and a shared object (CO) having a memory resource which can be referred to from the plurality of operating systems, wherein the shared object (CO) shares at least road information, and the road information registered by the application of one of the operating systems can be referred to from the application of the other operating system.

With this constitution, information can be shared by a plurality of devices, which improves controllability.

(2) In the above (1), it is preferable that while one of the operating systems registers road information to the shared object or refers to the road information, the shared object (CO) prohibits the other operating system from register road information to the shared object or from referring to the road information.

With this constitution, reference to incorrect information can be prevented when road information is registered to the shared object or referred to from the other operating system.

(3) In the above (1), it is preferable that when one of the operating systems registers road information to the shared object or refers to the road information, the shared object notifies the other operating system that road information is registered to the shared object or the road information is referred to.

With this constitution, the application of the other operating system can recognize that road information has been renewed.

(4) In the above (1), it is preferable that the application of one of the operating systems analyzes a signal received through broadcasting or communication and extracts road information as well as registers road information to the shared object, and the application of the other operating system controls the traveling speed of a one' own vehicle referring to the road information registered to the shared object.

(5) In the above (4), it is preferable that the application of one of the operating systems analyzes the signal received through the broadcasting or the communication and extracts information added to the road information as well as registers the added information to the shared object, and the application of the other operating system controls the traveling speed of the one's own vehicle referring to the road information and the added information registered to the shared object and to the traveling environment information of the vicinity of the one's own vehicle.

(6) Further, to achieve the above object, the present invention includes a plurality of operating systems (OS1, OS2) and a shared object (CO) having a memory resource which can be referred to from the plurality of operating systems, wherein the shared object (CO) shares at least road information, and the road information registered by the application of one of the operating systems can be referred to from the application of the other operating system.

(7) In the above (6), it is preferable that while one of the operating systems registers road information to the shared object or refers to the road information, the shared object (CO) prohibits the other operating system from register road information to the shared object or from referring to the road information.

(8) In the above (6), it is preferable that when one of the operating systems registers road information to the shared object or refers to the road information, the shared object (CO) notifies the other operating system that road information is registered to the shared object or the road information is referred to.

(9) In the above (6), it is preferable that the application of one of the operating systems analyzes a signal received through broadcasting or communication and extracts road information as well as registers road information to the shared object, and the application of the other operating system controls the traveling speed of a one' own vehicle referring to the road information registered to the shared object.

(10) In the above (9), it is preferable that the application of one of the operating systems analyzes the signal received through the broadcasting or the communication and extracts information added to the road information as well as registers the added information to the shared object, and the application of the other operating system controls the traveling speed of the one's own vehicle referring to the road information and the added information registered to the shared object and to the traveling environment information of the vicinity of the one's own vehicle.

BEST MODE FOR CARRYING OUT THE INVENTION

A constitution of a vehicle control apparatus according to an embodiment of the present invention will be described below using FIGS. 1 to 11.

First, a system constitution of the vehicle control apparatus according to the embodiment will be described using FIG. 1.

Figure 1:
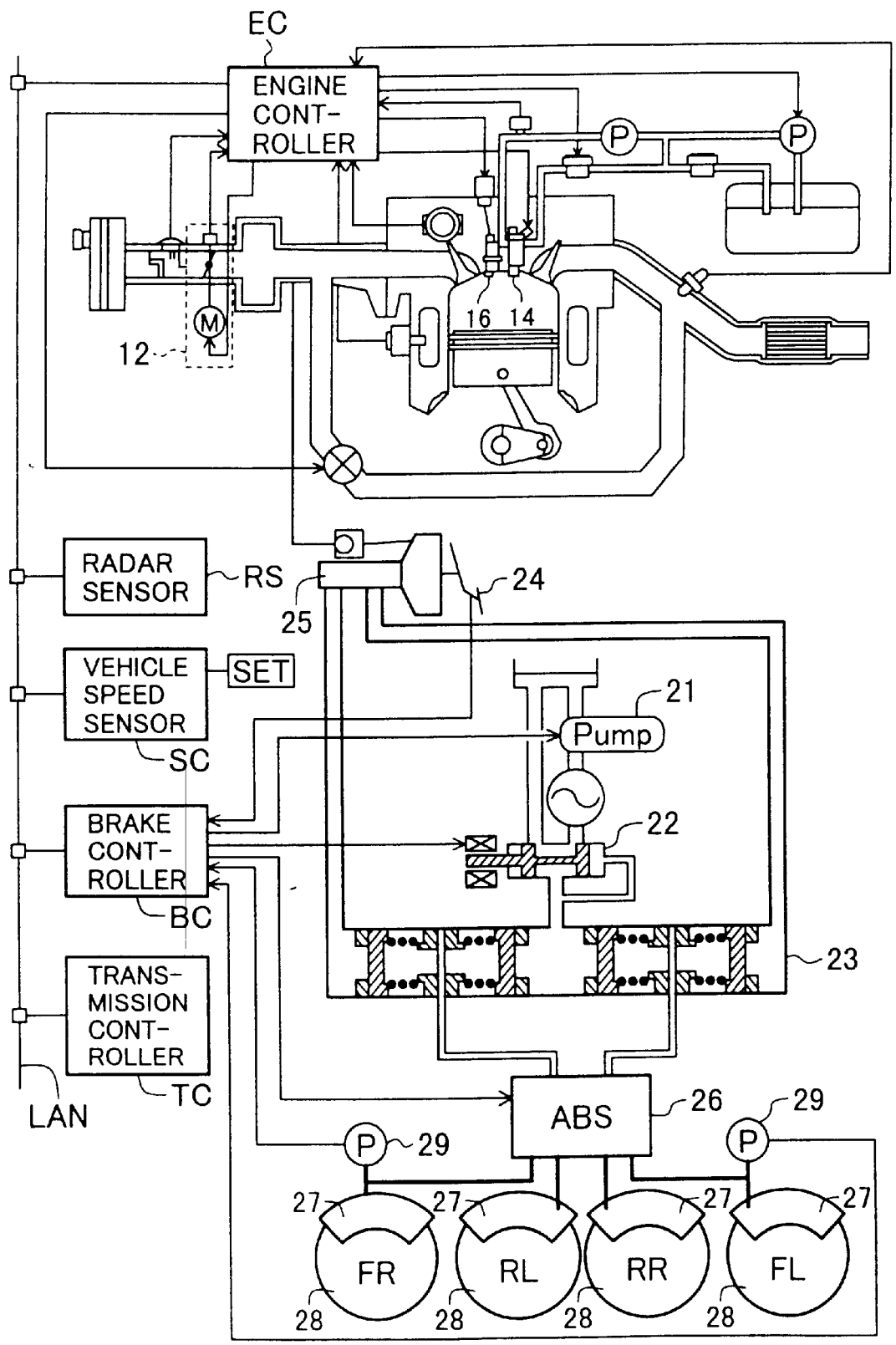
FIG. 1 is a system constitution view showing a constitution of a vehicle control apparatus according to an embodiment of the present invention.

FIG. 1 is a system constitution view showing the constitution of the vehicle control apparatus according to the embodiment of the present invention.

A vehicle speed controller SC, a radar sensor RS, an engine controller EC, a brake controller BC, and a transmission controller TC are connected to each other through a local area network LAN and transmit and receive a control signal and data to and from each other.

The radar sensor RS detects a distance between a vehicle traveling ahead and a one's own vehicle and a relative speed therebetween. The radar sensor RS transmits the detected distance between the vehicles and the detected relative speed to the vehicle speed controller SC through the local area network LAN.

The vehicle speed controller SC includes a wheel speed sensor and detects the speed of the one's own vehicle as described later using FIG. 2. Further, the vehicle speed controller SC captures a target distance between vehicles set by the operation of a driver using a target-distance-between-vehicles setting means SET. The vehicle speed controller SC includes a position information display means like a car navigator as described later using FIG. 2 and shares road information such as curved roads, slopes, and the like with the position information display means.

The vehicle speed controller SC calculates a target speed based on the distance between vehicles and the relative speed which are transmitted from the radar sensor RS, the one's own vehicle speed detected by the wheel speed sensor, the target distance between vehicles set by the setting means SET and the road information shared by the controller SC and the position information display means. Further, the vehicle speed controller SC calculates target torque based on the calculated target speed and the one's own vehicle speed and transmits a target torque command to the engine controller EC and the brake controller BC. Further, the vehicle speed controller SC transmits a gear change command to the transmission controller TC when it is necessary to change a gear ratio.

When the target torque is positive, the engine controller EC controls engine torque by appropriately actuating a degree of opening of an electronically controlled throttle 12, an amount of fuel ejected from a fuel injection valve 14 and an ignition timing of an ignition plug 16.

When the target torque is negative, the brake controller BC controls the brake torque of wheels by actuating a hydraulic pump 21 and a proportional solenoid valve 22 based on the target torque command transmitted from the vehicle speed controller SC. A valve 23 controls brakes 28 by transmitting a larger one of a hydraulic pressure of an automatic brake, which is regulated by the proportional solenoid valve, and a hydraulic pressure of a foot brake, which is applied from a master cylinder 25 when the driver actuates a brake pedal 24, to brake mechanisms 27 through an ABS 26. Brake hydraulic pressure sensors 14 detect brake hydraulic pressures applied to the brake mechanisms 27. The brake controller BC feedback controls the proportional solenoid valve 22 referring to the values of the brake hydraulic pressures detected by the brake hydraulic pressure sensors 14. Further, when the brake controller BC detects the locked state of the brakes based on the wheel speed data of the four wheels that is detected by the vehicle speed controller SC and transmitted thereto through the local area network LAN, the brake controller BC outputs a wheel lock release command to the ABS 26. The ABS 26 releases the wheel lock by controlling the four brake mechanisms 27 based on the wheel lock release command.

The transmission controller TC controls an automatic transmission based on the gear change command transmitted from the vehicle speed controller SC.

Next, a system constitution of the vehicle speed controller SC used in the vehicle control apparatus according to the embodiment will be described using FIG. 2.

Figure 2:
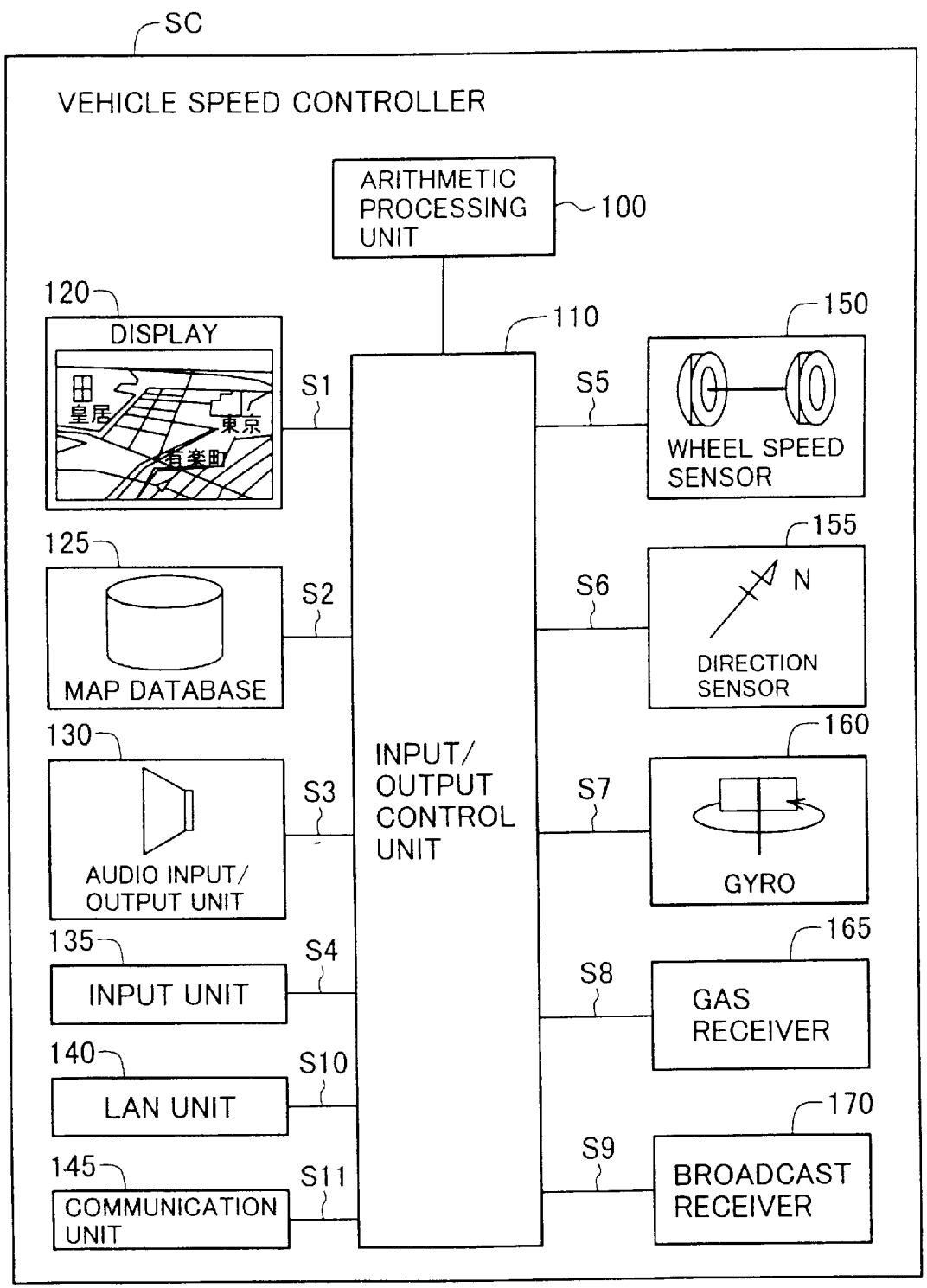
FIG. 2 is a system constitution view showing a constitution of a vehicle speed controller SC used in the vehicle control apparatus according to the embodiment of the present invention.

FIG. 2 is a system constitution view showing the constitution of the vehicle speed controller SC used in the vehicle control apparatus according to the embodiment of the present invention.

The vehicle speed controller SC according to the embodiment includes at least two functions of a position information display means such as car navigator and a vehicle control means for controlling a distance between vehicles, and has operating systems (OS) installed thereon corresponding to the respective functions. Note that while the vehicle speed controller SC includes OSs other than the two OSs, at least the OS of the position information display means and the OS of the vehicle speed control means share position information such as road information and the like.

The vehicle speed controller SC includes an arithmetic processing unit 100 and an input/output control unit 110.

The arithmetic processing unit 100 detects a present position from the sensor information outputted from various sensors (a wheel speed sensor 150, a direction sensor 155, a gyro 160, a GPS receiver 165) for measuring a position. Then, the arithmetic processing unit 100 reads map mesh data necessary to display a map from a map database 125 based on the obtained present position information and graphically expands the map data. The present position is displayed on a display 120 by overlapping a mark indicating the present position on the map data. Further, the arithmetic processing unit 100 searches an optimum path connecting a destination instructed by a user to the present position and displays the path on the display 120 by overlapping it on a map so as to guide the user to the destination through the path. Furthermore, the arithmetic processing unit 100 inquires about dynamic information necessary to the user to an information service center and displays the obtained dynamic information on the display 120. As described above, the arithmetic processing unit 100 has a function as a position information display means like a car navigation and includes a first OS for achieving this function as described later using FIG. 4.

Further, the arithmetic processing unit 100 calculates the target speed based on the distance between vehicles and the relative speed transmitted from the radar sensor RS, the one's own vehicle speed detected by the wheel speed sensor, the target distance between vehicles set by the setting means SET and the road information shared by the vehicle speed controller SC and the position information display means. Then, the vehicle speed controller SC calculates the target torque based on the calculated target speed and the one's own vehicle speed and transmits the target torque command to the engine controller EC and the brake controller BC, respectively. Further, the vehicle speed controller SC transmits the gear change command to the transmission controller TC when it is necessary to change the gear ratio. As described above, the arithmetic processing unit 100 includes a function as a vehicle speed control means and has the second OS for achieving the function as described later using FIG. 4.

The input/output control unit 110 is a unit for connecting the arithmetic processing unit 100 to peripheral devices and includes an I/O corresponding to the interface of the peripheral devices. The input/output control unit 110 will be described below in detail using FIG. 3. The input/output control unit 110 includes the display 120, the map database 125, an audio input/output unit 130, an input unit 135, a LAN unit 140, a communication unit 145, the wheel speed sensor 150, the direction sensor 155, the gyro 160, the GPS receiver 165, and a broadcast receiver 170 which are connected thereto.

The display 120 is a unit for displaying graphics information created by the input/output control unit 110 and composed of a CRT or a liquid crystal display. Further, a signal S1 between the arithmetic processing unit 100 and the display 120 is a RGB signal and an NTSC (National Television System Committee) signal.

The communication unit 145 is a unit for executing bi-directional communication by being connected to a public network and to a dedicated network, a portable phone and a PHS are available as equipment to be connected to the public network and an MCA system is available as the dedicated network. Further, A DSRC (short distance spot communication) such as an ETC (electronic tall collection) the installation of which is underway to collect a toll and a traffic tax is also included in the communication unit 145. Latest contents can be captured into a vehicle in abundance by connecting a vehicle-mounted navigation means to the Internet through the communication unit 145. Available as an example of the contents is map information including map mesh data, guide information, searched information and the gradients and radii of curvature of roads and the positions of intersections within the radius of 2 km from the location where the one's own vehicle exists.

The broadcast receiver 170 is a unit for receiving broadcasting waves transmitted from broadcast stations installed on the ground and satellites. The broadcasting waves are roughly divided into a wave for analog broadcasting and a wave for digital broadcasting, and necessary information is extracted by decoding the contents mainly received through the digital broadcasting by the receiver and by filtering the decoded contents by the arithmetic processing unit 100.

The map database 125 is composed of a large capacity storage medium such as a CD-ROM, DVD-ROM, DVD-RAM, IC card, hard disc and the like. The map database stores the map mesh data, guide information, searched information and the like which are necessary to display a map. Further, the map database 125 records map mesh data, guide information, and searched information as well as the gradients and radii of curvature of roads, the distance to a target position and the like which are necessary to control a vehicle through the communication unit 145 and the broadcast receiver 170 or stores them by updating them when necessary.

The audio input/output unit 130 converts a message to the user (for example, a guide voice), which is created by the arithmetic processing unit 100 to guide a vehicle along a guide path, into an audio signal. Further, the audio input/output unit 130 recognizes the voice of the user and transmits a result of recognition to the arithmetic processing unit 100. It should be noted that the audio input/output unit 130 may only include a function for converting the audio signal into a digital signal, and a voice may be recognized by the arithmetic processing unit 100.

The input unit 135 is a unit for receiving a command from the user and composed of hard switches such as a scroll key, a scaling key and the like, a joystick, a touch panel disposed on the display, and set, resume, cancel, and distance-between-vehicles setting keys mounted on a steering, and the like. Further, the input unit 135 may be a remote controller for making communication through infrared rays.

The LAN unit 140 is a unit for executing bi-directional communication with various units installed in the vehicle. LANs are ordinarily connected to a different LAN based on the use thereof and can be classified to an information system LAN, a control system LAN, an electrical components system LAN, and a diagnosis system LAN. Further, since a different transmission speed and different transmission quality are required in the respective uses, a LAN having a plurality of systems may be mounted.

A sensor used to detect a position by the vehicle-mounted navigation means is composed of the wheel speed sensor 150, the direction sensor 155, the gyro 160, the GPS receiver 165, and the like, wherein the wheel speed sensor 150 measures a distance from the product of the circumference of a wheel and the measured number of revolution of the wheel and further measures an angle at which a moving body turns from the difference between the numbers of revolution of a pair of wheels, the direction sensor 155 detects an direction toward which the moving body looks by detecting the magnet field of the earth, the gyro 160 detects an angle at which the moving body such as an optical fiber gyro, a vibration gyro and the like turns, and the GPS receiver 165 measures a present position, a moving speed, and a moving direction of the moving body by receiving signals from at least three GPS satellites and by measuring distances between the moving body and the GPS satellites and ratios of change of the distances. Note that all the sensors are not essential to the detection of the position, and the respective sensors may be used individually or in combination.

Next, hardware constitutions of the arithmetic processing unit 100 and the input/output control unit 110 of the vehicle speed controller SC used in the vehicle control apparatus according to the embodiment will be described using FIG. 3.

Figure 3:
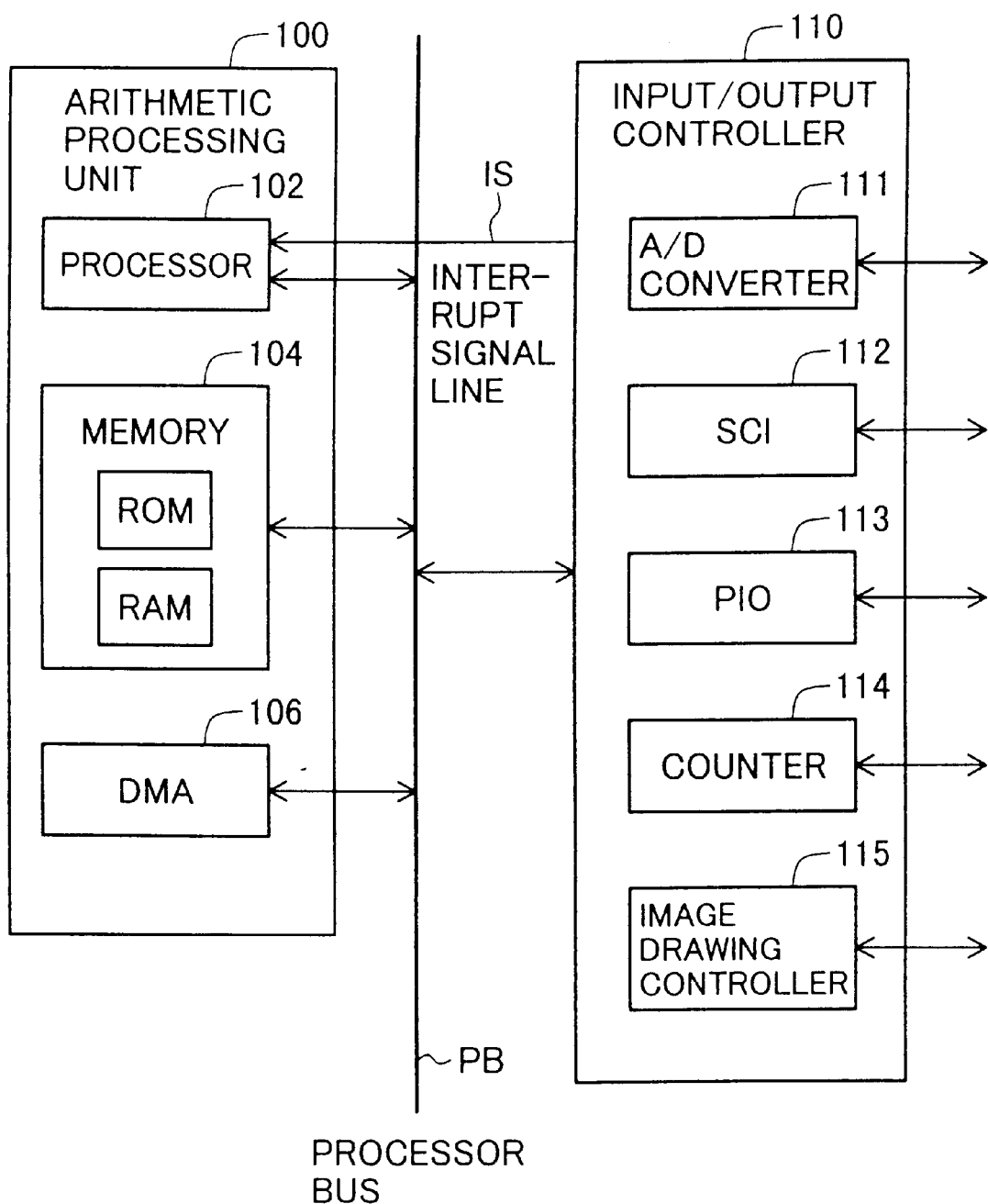
FIG. 3 is a hardware constitution view of the arithmetic processing unit 100 and the input/output control unit 110 of the vehicle speed controller SC used in the vehicle control apparatus according to the embodiment of the present invention.

FIG. 3 is a hardware constitution view of the arithmetic processing unit 100 and the input/output control unit 110 of the vehicle speed controller SC used in the vehicle control apparatus according to the embodiment of the present invention.

The input/output control unit 110 is a unit for connecting the arithmetic processing unit 100 to the peripheral devices and includes the I/O corresponding to the interface of the peripheral devices. The I/O includes an A/D converter 111, a SCI (serial communication interface) 112, a PIO (parallel input/output) unit 113, a counter 114, an image drawing controller 115, and the like. The A/D converter 111 converts an inputted analog signal into a digital signal. The SCI 112 converts serial signals which are transmitted at a predetermined communication speed in time-series into parallel signals and converts the parallel signals into the serial signals. The PIO 113 samples the parallel signals at a predetermined timing. The counter 114 counts the number of pulses inputted in a predetermined time unit by integrating the pulse signals. The image drawing controller 115 converts drawn data into pixel information at a high speed and outputs display signals to the display at a predetermined bit rate.

The input/output control unit 110 is connected to the arithmetic processing unit 100 through a processor bus PB. Further, an interrupt signal line IS is outputted to a processor 102 to notify the completion of an input/output operation to the peripheral devices, and the like. While the interrupt signal line IS and the processor bus PB are shown as if they are signal lines in FIG. 3 for the purpose of explanation, the interrupt signal line IS is actually a portion of the processor bus PB.

The arithmetic processing unit 100 is composed of a processor 102 for executing various type of processing such as numerical operation and the control of respective devices, memories 104 for storing various types of data such as map data, search data, and arithmetic operation data, and processing programs, and devices such as a DMA (direct memory access) 106 for transferring data between the memories and between the memories and respective devices. A shared object as a feature of the embodiment is stored in the memory 104.

Next, a relationship between a hardware constitution and a software constitution of the vehicle speed controller SC used in the vehicle control apparatus according to the embodiment will be described using FIG. 4.

Figure 4:
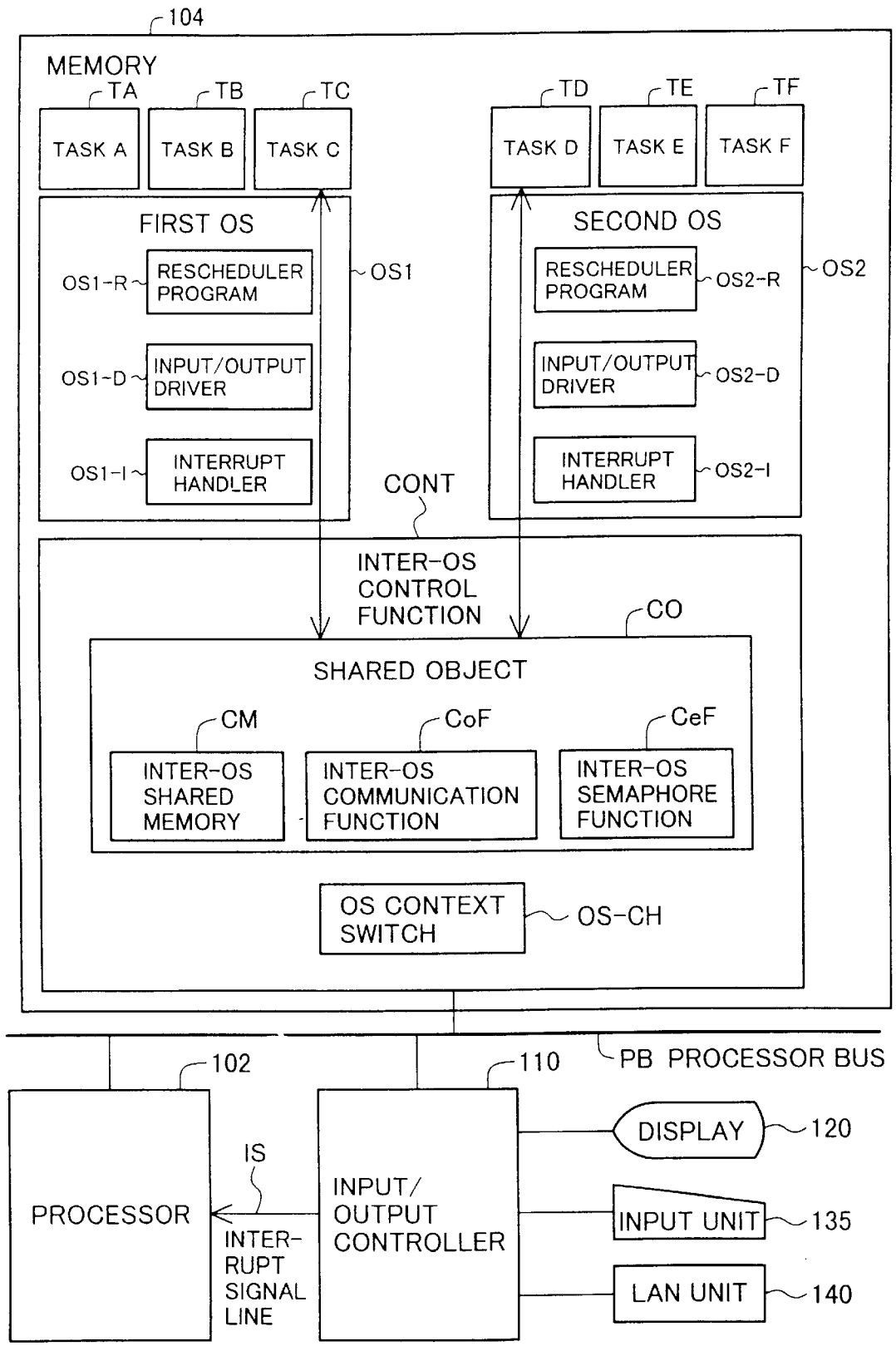
FIG. 4 is a block diagram showing a hardware constitution and a software constitution of the vehicle speed controller SC used in the vehicle control apparatus according to the embodiment of the present invention.

FIG. 4 is a block diagram showing the hardware constitution and the software constitution of the vehicle speed controller SC used in the vehicle control apparatus according to the embodiment of the present invention.

The processor 102 is a microprocessor that operates on the plurality of operating systems. The memory 104 includes operating system programs OS1 and OS2, task programs TA, TB, TC, TD, TE, and TF operating on the respective operating systems, and an inter-OS control function program CONT.

The operating system programs OS1 and OS2 include rescheduler programs OS1-R and OS2-R, input/output driver programs OSD-1 and OSD-2 for the respective operating systems, and interrupt handler programs OS1-I and OS2-I.

The inter-OS control function program CONT includes a shared object CO and an OS context switch OS-CH. The shared object CO includes an inter-OS shared memory CM, an inter-OS communication function CoF, and an inter-OS semaphore function CeF. Note that these programs are read out and executed by the processor 102.

The processor 102 has a function for masking an internal interrupt from an external interrupt and the like notified by the interrupt signal line IS. The interrupt masking is a function for delaying a particular interrupt until a program releases the interrupt masking. In general, three types of interrupt masking functions are available as shown below.

(1) Masking of all the interrupt: all the interrupts are masked.

(2) Masking of individual interrupts: interrupts are masked individually.

(3) Masking based on interrupt levels: levels are set to respective interrupts and interrupts below a designated level are masked.

In many cases, the processor 102 includes a combination of the functions (1) and (2) or a combination of the functions (1) and (3) depending upon a type thereof. When a processor including the latter combination is employed, an interrupt level is allocated according to the importance of a corresponding input/output unit and a minimum response time.

The vehicle speed controller SC according to the embodiment operates the operating systems OS1 and OS2 in parallel with each other. The operating systems OS1 and OS2 execute the tasks TA . . . TF using the memories allocated thereto and a processor resource. Note that while FIG. 4 shows an example in which the number of the operating systems is two and the number of a total tasks is six, operations systems and tasks the number of which is larger or smaller than these numerical values may be installed. While a dynamic change of the number of tasks on the operating systems is not assumed in the embodiment, it is possible for the respective operating systems to dynamically create and delete a task. Further, the operating systems OS1 and OS2 may be combined in any type, and for example, a real time OS having a short starting-up cycle (example: starting-up cycle of 10 [ms]) may be employed as one of the operating systems and a real time OS having a long starting-up cycle (example: starting-up cycle of 100 [ms]) may be employed as the other of them. Further, it is assumed that the priority of the second operating systems OS2 is higher than that of the first operating system OS1 for the convenience of explanation. In the above assumption, when any task of the second operating system OS2 is executed, the second operating system OS2 uses the processor resource, whereas when all the tasks of the second operating system OS2 are in an idle state or in a wait state, the context is switched to the first operating system OS1 and the first operating system OS1 uses the processor resource.

The input/output drivers OS1-D and OS2-D of the operating systems OS1 and OS2 process data inputted and outputted between them and the input/output unit. The input/output driver OS1-D and OS2-D provide interfaces for controlling the input/output unit from the respective tasks as well as provide a function for outputting and inputting data by reading and writing data from and to the input/output unit and for controlling the input/output system.

The interrupt handlers OS1-I and OS2-I receive an interrupt request from the input/output unit. The interrupt handlers OS1-I and OS2-I are invoked by each type of interrupt and execute an interrupt processing program defined by the user.

The reschedulers 208 and 209 are started when a task must be switched at a time a task is created, deleted, stopped, and restarted and must be switched at a time an interrupt is performed externally or internally. The reschedulers executes the selected task by storing the environment (program counter, status register, general-purpose register, and the like) in which a task was executed immediately before on a task management table, determining a task to be executed newly, capturing the environment in which the task is to be executed from the task management table and setting the environment to respective registers.

The inter-OS control function program CONT is used to operate the first and second operating systems OS1 and OS2 on the single processor 102 in association with each other. The inter-OS control function program CONT includes the shared object CO and the OS context switch OS-CH. The shared object CO is a function for executing the exclusive management and the synchronous processing of information to be shared by all the tasks from the plurality of tasks which operate on a plurality of operating systems. The shared object CO includes the inter-OS shared memory CM, the inter-OS communication function CoF, and the inter-OS semaphore function CeF. The inter-OS shared memory CM is a memory that can be accessed from both first and second operating systems OS1 and OS2 therebetween. The inter-OS communication function CoF transmits a message between the first and second operating systems OSI and OS2. The inter-OS communication function CoF realizes an exclusive control and synchronization between the first and second operating systems OS1 and OS2. Further, the OS context switch OS-CH switches environments in which the first and second operating systems OS1 and OS2 are executed.

In the vehicle speed controller SC, the information managed by the shared object CO includes position information to be managed by a node unit, for example, a present position of the one's own vehicle, a destination, an area through which the vehicle travels, position information to be managed by a link unit such as traffic jam information and a path information up to a predetermined location, position information and static information and dynamic information added to the position information, and peripheral information of the one's own vehicle such as a distance between vehicles, a relative speed, and a one's own vehicle speed. The static information is information that is not changed by time such as the name of a facility, contents of service provided by the facility, and the like. The dynamic information is information that is changed as a time passes such as a business hour, the full and vacant information of a parking, and the like. Note that information registered to the shard object is not limited to the above information and it is possible to register various types of information to the shared object and to refer to the various types of information therefrom.

Incidentally, when the inter-OS shared memory is referred to from the plurality of operating systems, the following problems arise. First, when an OS context is switched while information is registered from, for example, an application executed on the first operating system OS1 so as to refer to the same information from an application executed on the second operating system OS2, there is a possibility that erroneous information is referred to if the information is not perfectly registered.

Second, even if information is registered from the application being executed on the first operating system OS1, the application being executed on the second operating system OS2 cannot recognize that the renewal of the information. Third, the individual installation of the above function on the respective applications requires to modify a program in order to share new information by the plurality of operating systems, which increase a man-hour and a term necessary to development.

To solve the above problem, in the embodiment, the shared object CO, which manages information to be shared by the plurality of operating systems, is separated from applications and arranged as an independent shared object so as to provide a function for exclusively accessing to information even if registration and reference to the shared object CO are simultaneously executed from the plurality of operating systems and to provide a function for notifying that registered information is renewed to the other applications when a job of registration and reference is carried out to the shared object. These functions are realized by invoking the inter-OS shared memory CM, the inter-OS communication function CoF and the inter-OS semaphore function CeF in combination from the shared object CO.

An API (application programming interface) is employed in the application of each operating system as an interface for accessing to the shared object CO, the API being used for the creation of the shared object, the registration to the shared object, the reference to the shared object, the deletion of the shared object. Further, to realize an access to each object, a different API is provide with each object to be shared or an object is discriminated by an argument to an API. The shared object is accessed to by each application using the common API.

An object of the inter-OS shared memory CM of the shared object CO is to realize the exchange of data between the operating systems at a high speed, and writing and reading can be carried out from both first and second operating systems OS1 and OS2. The inter-OS communication function CoF prepares a message queue corresponding to each of the operating systems and delivers messages therebetween. The inter-OS semaphore function CeF is a binary semaphore and used to realize an exclusive control between the operating systems. The OS context switch OS-CH switches a context when it is determined that an operating system must be switched by a request for interrupt or by that an inter-OS control function is invoked.

Next, an internal constitution of the processor 102 used in the vehicle control apparatus according to the embodiment will be described using FIG. 5.

Figure 5:
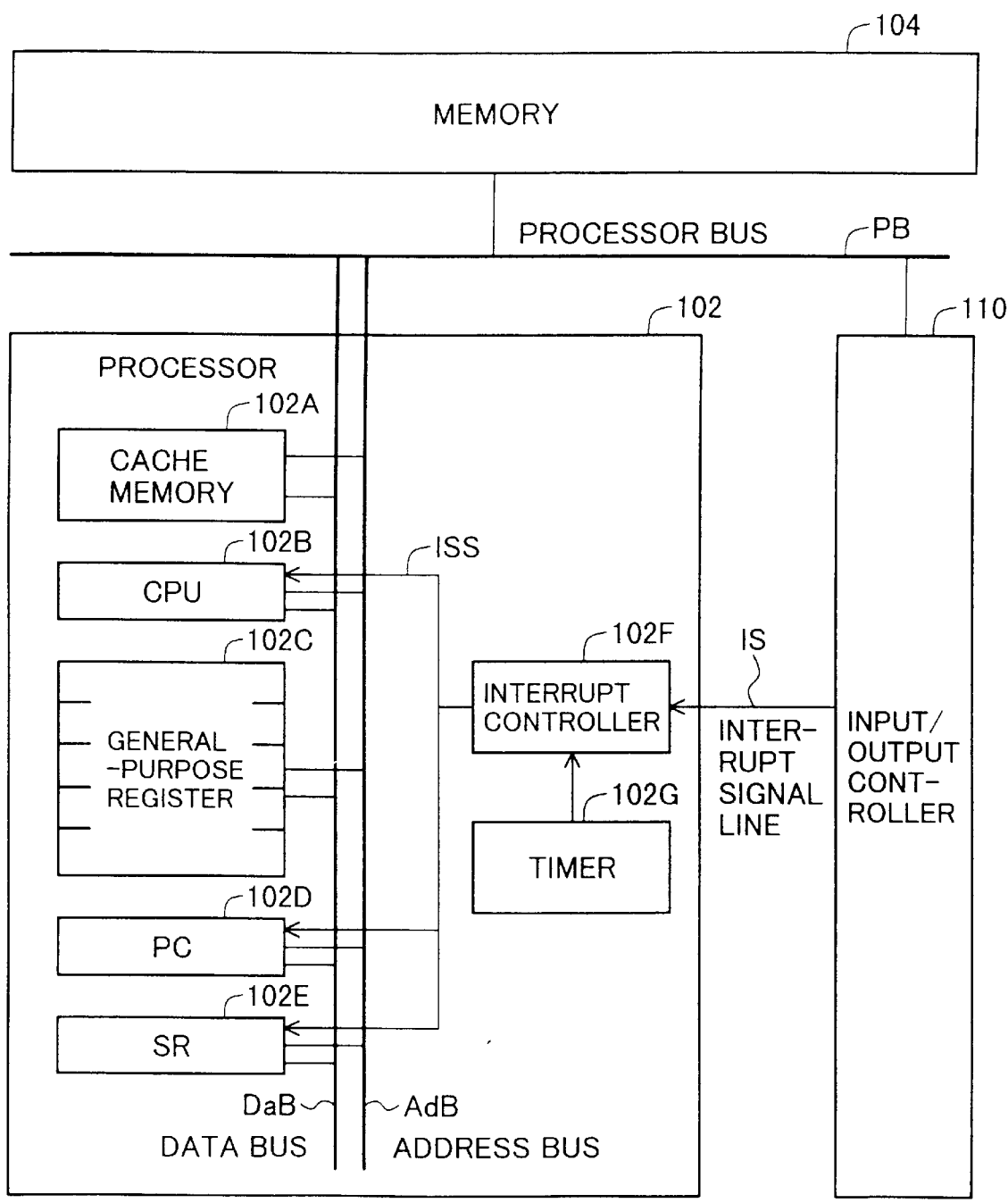
FIG. 5 is a block diagram showing an internal constitution of a processor 102 used in the vehicle control apparatus according to the embodiment of the present invention.

FIG. 5 is a block diagram showing the internal constitution of the processor 102 used in the vehicle control apparatus according to the embodiment of the present invention.

The processor 102 includes a cache memory 102A, a CPU 102B, a general-purpose register 102C, a program counter 102D, a status register 102E, an interrupt controller 102F, and a timer 102G. The cache memory 102A, the CPU 102B, the general-purpose register 102C, the program counter 102D, and the status register 102E are interconnected through a data bus DaB for transferring data and an address bus AdB for designating addresses.

The cache memory 102A is a buffer storage medium for temporarily storing data or a command in the memory 104. The CPU 102B is an arithmetic operation circuit and sequentially reads and executes commands existing on the memory 104 or the cache memory 102A. A command is executed using the general-purpose register 102C for temporarily storing a result of the arithmetic operation, the program counter 102D for storing the address of the command to be executed and the status register 102E for storing the executed state of the command.

The interrupt signal line IS from the input/output control unit 110 and the timer 102G are connected to the interrupt controller 102F. The interrupt controller 102F creates an interrupt state signal ISS to the CPU 102B. The interrupt state signal ISS is a signal line which indicates what type of interrupt is made to the processor 102 at present. Ordinarily, the status register 102E has information as to a present interrupt mask and determines whether or not an interrupt designated by the interrupt state signal ISS is to be accepted. When the interrupt is accepted, the interrupt controller 102F rewrites the values of the program counter 102D, the status register 102E and the like and executes a corresponding interrupt processing program.

Next, how the shared object is created will be described using FIG. 6, how registration is performed to the shared object will be described using FIG. 7, and how reference is made to the shared object will be described using FIG. 8.

First, the contents of shared object creation processing will be described using FIG. 6.

Figure 6:
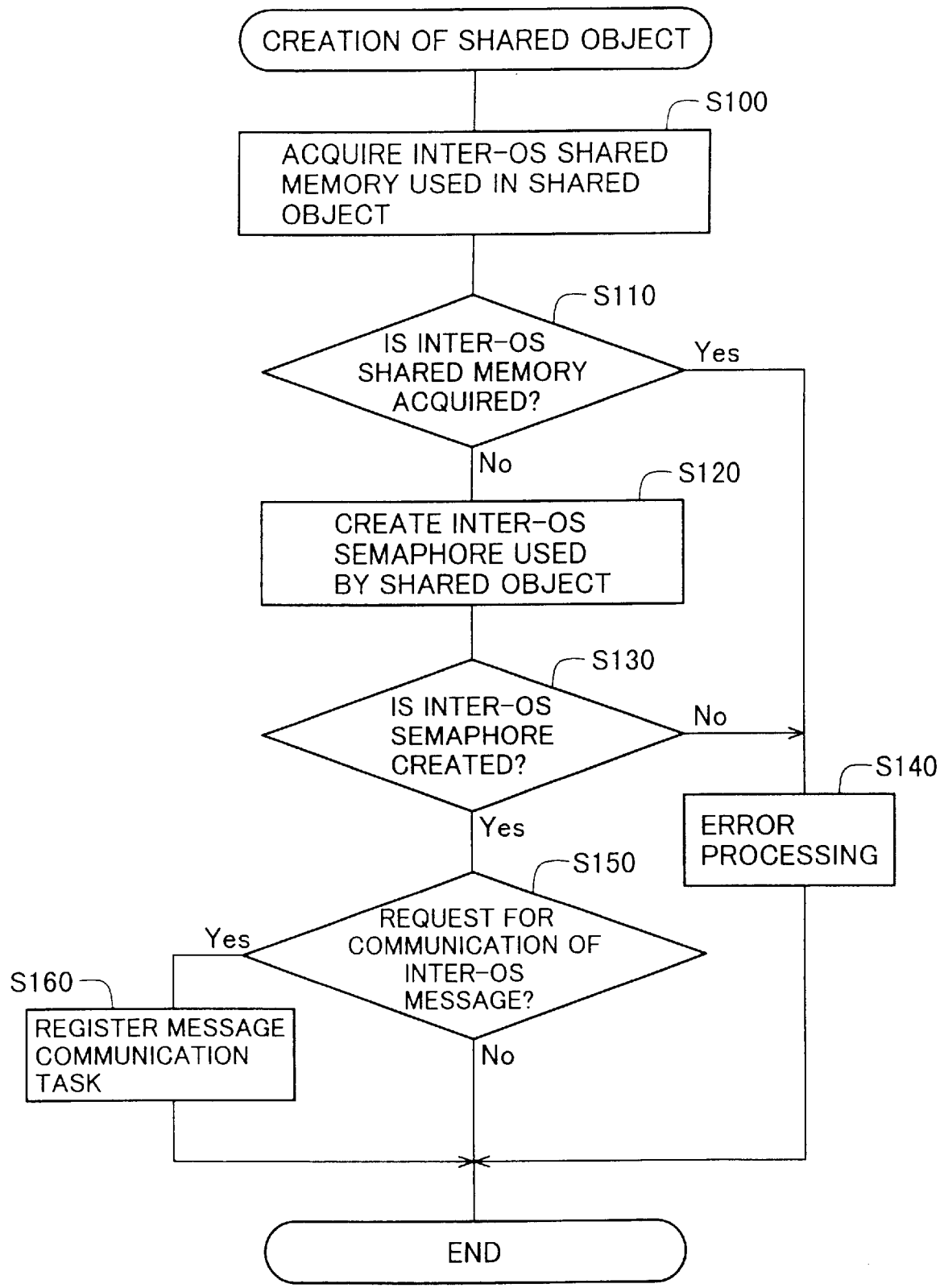
FIG. 6 is a flowchart showing the contents of processing for creating a shared object used in the vehicle control apparatus according to the embodiment of the present invention.

FIG. 6 is a flowchart showing the contents of processing for creating the shared object used in the vehicle control apparatus according to the embodiment of the present invention.

At step s100, the second operating system OS2 obtains an inter-OS shared memory CM used by a designated shared object CO based on the attribute of the shared object and a necessary amount of memory. The inter-OS shared memory CM searches an unused memory space from a memory space allocated as a shared memory and allocates the memory space to the shared object CO.

At step s110, the second operating system OS2 determines whether or not the inter-OS shared memory CM could be acquired, and when it could be acquired, the process goes to step s120, otherwise, the process goes to step s140. For example, when such an error that a free memory space is insufficient and the inter-OS shared memory cannot be acquired occurs, the error is processed at step s140.

When the second operating system OS2 is succeeded in the acquisition of the inter-OS shared memory CM, the second operating system OS2 creates an inter-OS semaphore CeF for exclusively managing the inter-OS shared memory CM at step s120. The inter-OS semaphore CeF used here is binary semaphore, and only one task on a plurality of operating systems can acquire the semaphore.

Next, at step s130, the second operating system OS2 determines whether or not the inter-OS semaphore CeF could create semaphore. When the semaphore could be created, the process goes to step s150, whereas when the creation of the semaphore was failed, the process goes to step s140.

When it is determined at step s110 that the inter-OS shared memory could not be acquired and when it is determined at step s130 that the inter-OS semaphore CeF could not be created, the second operating system OS2 executes error processing at step s140. Acquired resources are released as the contents of the error processing. The resources to be released here are the inter-OS shared memory and inter-OS semaphore. The release of these resources prevents the leakage of a memory resource used in the inter-OS shared memory and the inter-OS semaphore.

When it is determined at step s130 that the inter-OS semaphore CeF could be created, the second operating system OS2 determines at step s150 whether or not it transmits a message through inter-OS message communication when it registers information to the created shared object CO or it refers thereto. Whether the message is to be transmitted or not is determined here by a parameter which was inputted when the shared object was created, that is, when a destination to which the massage is to be transmitted is inputted, it is determined that the transmission of the message is requested. When it is determined that the transmission of the message is requested, the process goes to step 160, otherwise, the creation of the shared object is finished.

When it is determined that the transmission of the message is requested, the second operating system OS2 registers the task of a party to which a message is transmitted through the message communication when it registers information to the shared object CO or it refers to the shared object CO at step s160. One task or a plurality of tasks may be registered here.

While it is described in the above explanation that the task of the party to which a message is transmitted through the inter-OS message communication is registered when information is registered to the shared object or the shared object is referred to in the creation of the shared object, an application, to which a massage is notified, may be set from an application for registering information to the shared object or for referring to the shared object. This constitution permits a destination to which a message is notified to be optionally set even after the shared object is created. Thus, it is possible to newly add an application for registering position information and for referring to the position information without modifying an existing application.

Note that, while shared object is created by the second operating system OS2 in the above explanation, it may be created by the first operating system OS1.

Further, while the creation of the shared object is described in the above explanation, when the shared object is deleted, the inter-OS shared memory and the inter-OS semaphore, which are used by the shared object, are released similarly to the above-mentioned error processing.

Next, processing for registering information to the shared object will be described using FIG. 7.

Figure 7:
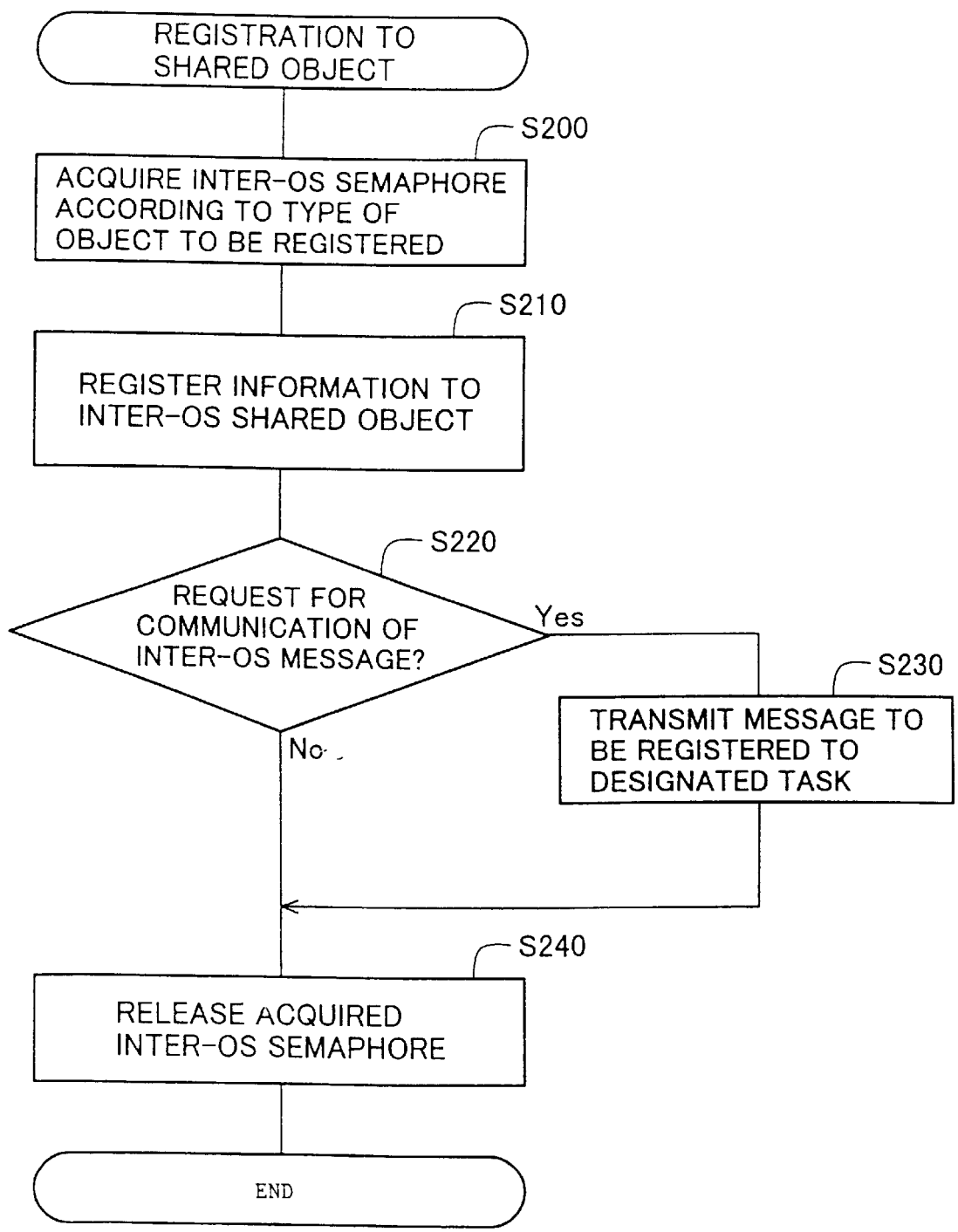
FIG. 7 is a flowchart showing the contents of registration processing to the shared object used in the vehicle control apparatus according to the embodiment of the present invention.

FIG. 7 is a flowchart showing the contents of registration processing to the shared object used in the vehicle control apparatus according to the embodiment of the present invention.

At step s200, an operating system (for example, first operating system) which executes the registration processing acquires a corresponding inter-OS semaphore CeF in accordance with a type of an object to be registered. Exemplified as a method of acquiring semaphore is a method of instantly returning to an error when the semaphore cannot be acquired, a method of returning to an error when semaphore cannot be acquired for a predetermined period of time, a method of waiting the acquisition of semaphore forever, and the like. The method of returning to the error when semaphore cannot be acquired for the predetermined period of time is employed here. When the process returns to the error, the registration processing to the shared object is finished.

Next, at step s210, an operating system for executing the registration registers the information applied to the inter-OS shared memory CM in accordance with a type of n object to be registered.

Next, at step s220, the operating system which executes the registration processing determines whether or not a task for transmitting the massage is registered when information is registered in the shared object now being subjected to the registration processing. When the task is not registered, the process goes to step s240, otherwise, the process goes to step s230.

When the task for transmitting the message is registered, the operating system for executing the registration processing notifies through message communication that the registration to the shared object has been executed to one or a plurality of tasks having been registered. When a task having been registered and a task to be notified operate on the same operating system, the message communication provided with the operating system is used, whereas when they operates on a different operating system, inter-OS message communication is used.

Next, at step s240, the operating system which executes the registration processing releases the inter-OS semaphore acquired at step s200 and finishes the registration processing to the shared object.

In the above processing steps, when processing is executed at steps s210 to s230, the inter-OS semaphore function CeF prohibits the acquisition of semaphore from other OSs. Accordingly, such a situation that erroneous information is referred to if information is not perfectly registered can be avoided, which would be otherwise caused when, for example, an OS context is switched while information is registered from an application executed on the first operating system OS1 so as to refer to the same information from an application executed on the second operating system OS2.

Further, when information is registered from the application executed on the first operating system OS1, the application executed on the second operating system OS2 can recognize that the information has been renewed because a registration massage is transmitted to other task by the processing at step s230.

Further, since the shared object is shared by the respective applications, a program need not be modified when it is intended to share new information between a plurality of operating systems, which can reduce a man-hour and a term necessary to development.

Next, referring processing to the shared object will be described using FIG. 8.

Figure 8:
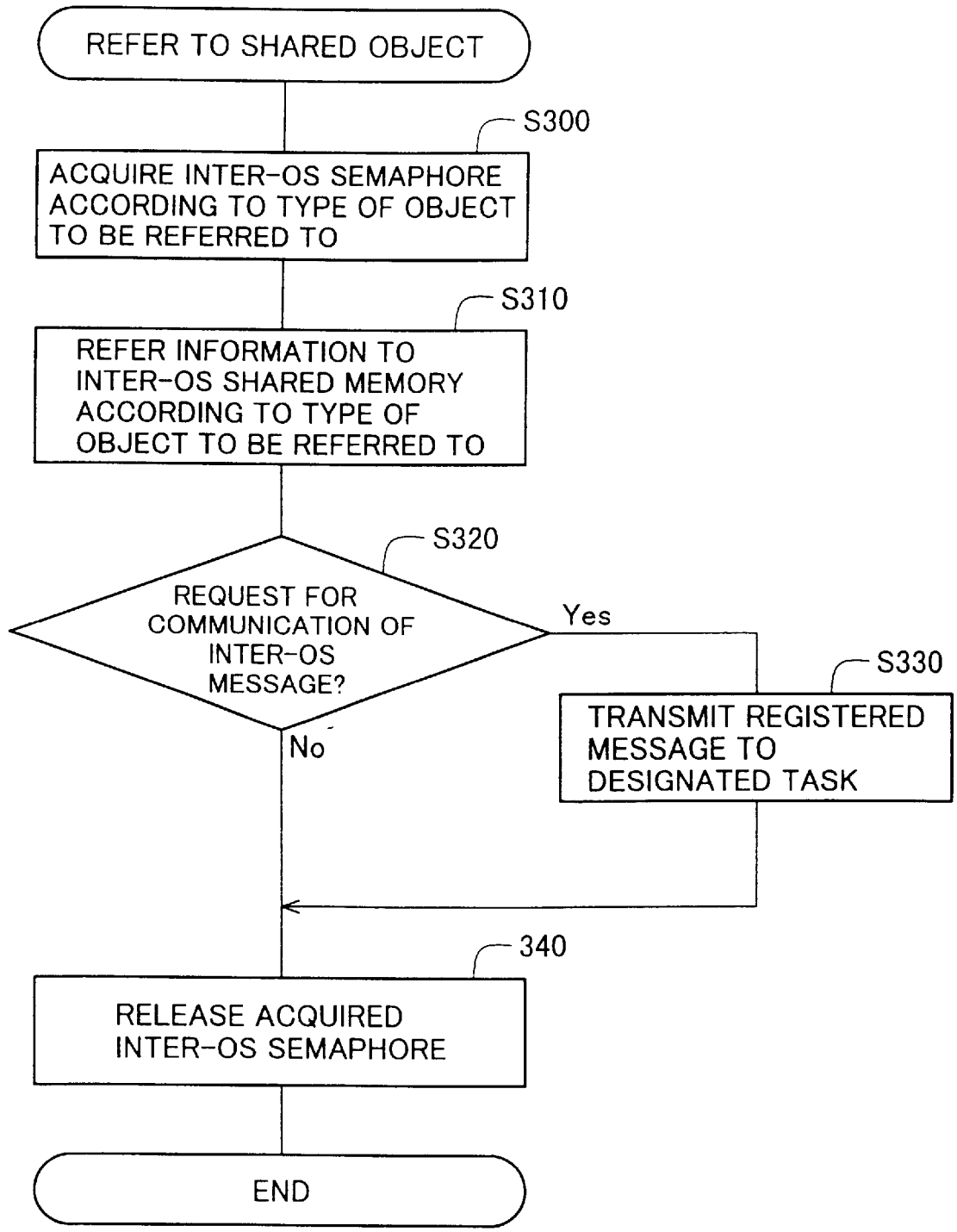
FIG. 8 is a flowchart showing the contents of reference processing to the shared object used in the vehicle control apparatus according to the embodiment of the present invention.

FIG. 8 is a flowchart showing the contents of reference processing to the shared object used in the vehicle control apparatus according to the embodiment of the present invention.

At step s300, an operating system (for example, the first operating system) which executes the referring processing acquires a corresponding inter-OS semaphore CeF in accordance with a type of an object to be referred to. Exemplified as a method of acquiring semaphore is a method of instantly returning to an error when the semaphore is not acquired, a method of returning to an error when semaphore cannot be acquired for a predetermined period of time, a method of waiting the acquisition of the semaphore forever, and the like. The method of returning to the error when the semaphore cannot be acquired for the predetermined period of time is employed here. When the process returns to the error, the referring processing to the shared object is finished.

Next, at step s310, the operating system for executing the referring processing refers to the information applied to the inter-OS shared memory CM in accordance with the type of the object to be referred to.

Next, at step s320, the operating system for executing the reference processing determines whether or not a task to which a massage is to be transmitted is registered when information is referred to in a shared object now being subjected to the reference processing. When the task is not registered, the process goes to step s340, otherwise, the process goes to step s330.

When the task to which the massage is to be transmitted is registered, the operating system which executes the reference processing notifies that the shared object has been referred to to the one or plurality of tasks having been registered through message communication at step s230. When a task having been referred to and a task to be notified operate on the same operating system, the message communication provided with the operating system is used, whereas when they operates on a different operating system, the inter-OS message is used.

Next, at step s340, the operating system which executes the reference processing releases the inter-OS semaphore acquired at step s300 and finishes the reference processing to the shared object.

In the above processing, when processing is being executed at steps s310 to s330, the inter-OS semaphore function CeF prohibits the acquisition of semaphore from other OS. Accordingly, such a situation that erroneous information is referred to can be avoided, which would be otherwise caused when, for example, an OS context is switched while information is referred to from an application being executed on the first operating system OS1 so as to register the same information from an application being executed on the second operating system OS2.

Further, when information is referred to from the application executed on the first operating system OS1, the application executed on the second operating system OS2 can recognize that the information is referred to because a message of registration is transmitted to other tasks by the processing at step s330.

Next, a specific example of the vehicle control apparatus according to the embodiment will be described using FIGS. 9 to 11.

First, a relationship between a hardware constitution and a software constitution of the vehicle speed controller SC according to the embodiment when a vehicle speed control application and a navigation application are installed on the vehicle control apparatus according to the embodiment will be described using FIG. 9.

Figure 9:
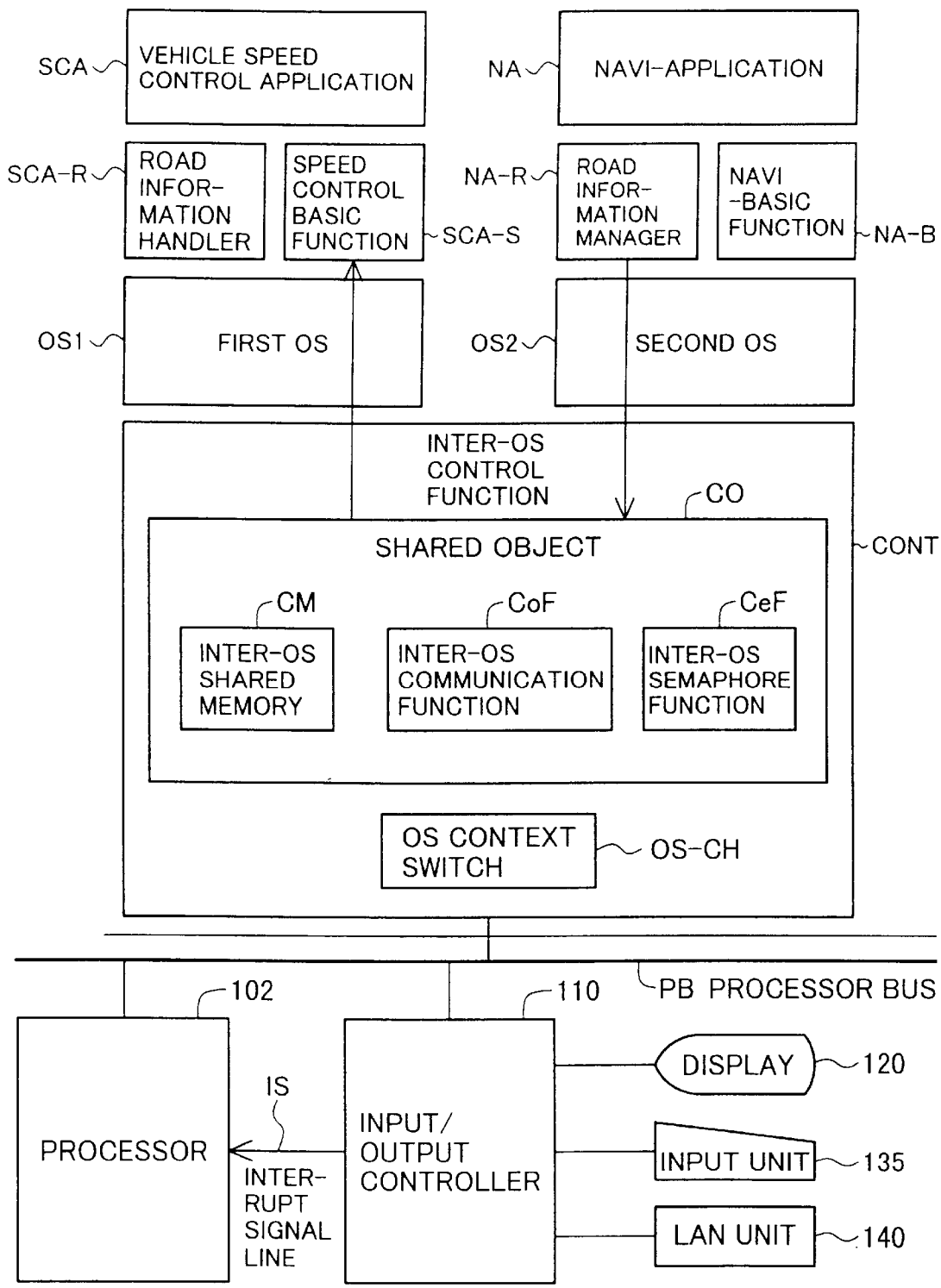
FIG. 9 is a block diagram showing a hardware constitution and a software constitution of the vehicle speed controller SC used in the vehicle control apparatus according to the embodiment of the present invention.

FIG. 9 is a block diagram showing the hardware constitution and the software constitution of the vehicle speed controller SC used in the vehicle control apparatus according to the embodiment of the present invention. Note that the same numerals as used in FIG. 4 denote the same components.

In the embodiment, a vehicle speed control application SCA is installed as an application of the first operating system OS1. Further, a navi-application NA is installed as an application of the second operating system OS2. The first operating system OS1 is a real time operating system arranged simply in order to reliably control traveling at a high speed. The second operating system OS2 is a real time operating system for executing an application which requests complex real time processing such as car navigation although the processing is executed at a low speed.

A navi-basic function SCA-P is a library having a basic function necessary to a navigation apparatus. The navi-basic function SCA-P includes a map display function, a search function, a one's own vehicle position measuring function, a recommended path search function, a recommended path guide function, and the like. The navi-application NA analyzes position information and user operation information and invokes the navi-basic function SCA-P, thereby providing a user with navi-information through an output interface such as a display, a voice, and the like. A road information manager NA-R registers road information to the shared object CO as well as refers to the road information from the shared object CO. Exemplified as the information registered to the shared object CO are road information such as the gradient and the radius of curvature of a road at a position where a vehicle exists, and the like, the position information of facilities and the static/dynamic information added to the position information, and supplementary information such as traffic jam information, recommended path information, and the like. A method of expressing the traffic jam information and the recommended path information includes various methods such as a method of expressing them by enumerating dots and columns showing position information, a method of expressing them by links of curved lines, and the like.

A road information handler SCA-R refers the road information registered by the road information manager NA-R as well as registers necessary information to the shared object CO. The speed control basic function SCA-P sets a target speed from a distance between vehicles, a relative speed and a one's own vehicle speed. At that time, a speed control basic function SCA-S also sets the target speed based on the road information referred to from the shared object CO by the road information handler SCA-R. Then, the speed control basic function SCA-S calculates target engine torque and target brake torque based on the target speed.

Next, the contents of processing of the vehicle speed control application installed on the vehicle control apparatus according to the embodiment will be described using FIGS. 10 and 11.

Figure 10:
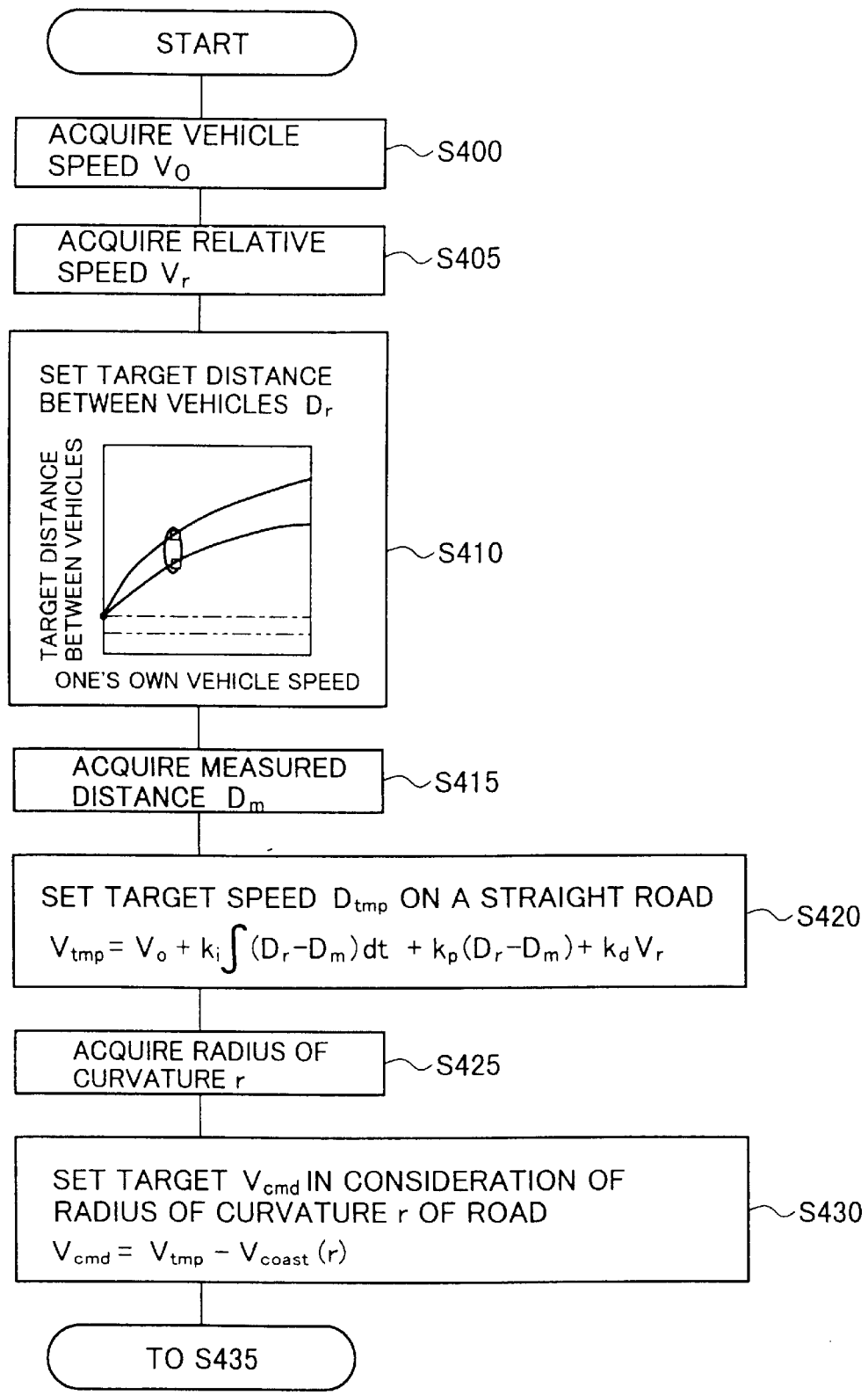
FIG. 10 is a flowchart showing processing contents of a vehicle speed control application installed on the vehicle control apparatus according to the embodiment of the present invention.
Figure 11:
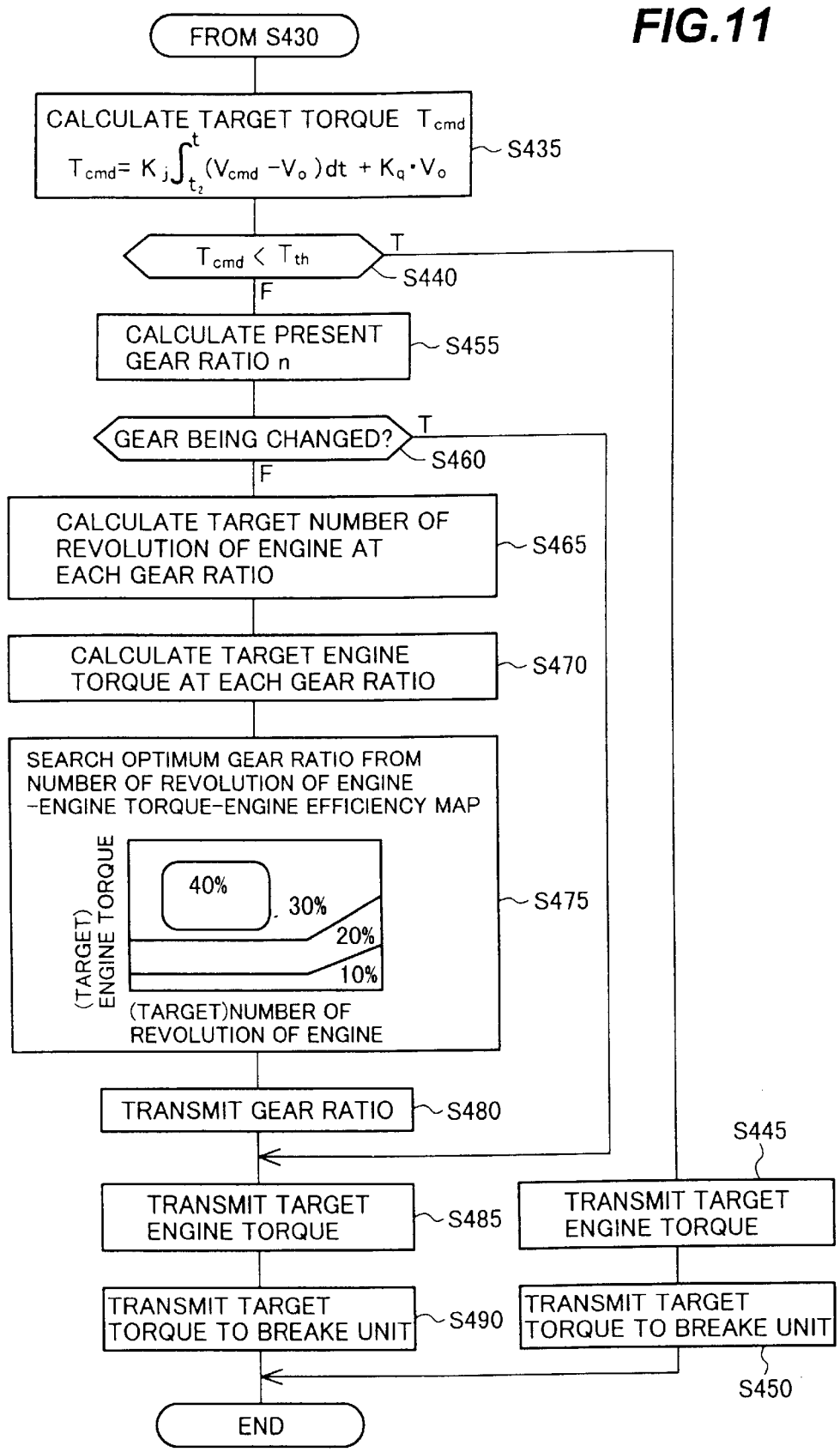
FIG. 11 is a flowchart showing processing contents of the vehicle speed control application installed on the vehicle control apparatus according to the embodiment of the present invention.

FIGS. 10 and 11 are flowcharts showing the contents of the processing of the vehicle speed control application installed on the vehicle control apparatus according to the embodiment of the present invention. Note that step s435 in FIG. 11 is continued from step s430 of FIG. 10.

At step s400, the speed control basic function SCA-S of the vehicle speed control application SCA acquires a one's own vehicle speed V0 from the output of the wheel speed sensor 150 shown in FIG. 2.

Next, at step s405, the speed control basic function SCA-S acquires a relative speed Vr from the output of the radar sensor RS shown in FIG. 1.

Next, at step s410, the speed control basic function SCA-S sets a target distance between vehicles Dr. A speed of a vehicle traveling ahead can be measured from the sum of the one's own vehicle speed V0 and the relative speed Vr. When the vehicle speed of the vehicle traveling ahead is zero or less, the target distance between vehicles Dr is set to a stop distance between vehicles. When the vehicle speed of the vehicle traveling ahead is zero or more, a target traveling distance between vehicles Dr is set in accordance with the one's own vehicle speed V0.

Next, at step s415, the speed control basic function SCA-S acquires a measured distance between vehicles Dm.

Next, at step s420, the speed control basic function SCA-S sets a target speed on straight road Vtmp. The target speed on straight road Vtmp is set by calculating the following formula (1).

$$Vtmp = V0 + ki \cdot \int (Dr-Dm)dt + kp \cdot \int (D-Dm)dt + kd \cdot Vr \quad (1)$$

where ki, kp and kd are control constants and set to predetermined values.

Next, at step s425, the road information handler SCA-R acquires road information from the inter-OS shared memory CM of a shared object COb. Then, the speed control basic function SCA-S calculates the radius of curvature of a road on which a vehicle intends to travel from the acquired road information. Since the road information is represented by the coordinates of respective points (nodes) on a road (coordinates of latitudes and longitudes), the radius of curvature of the road can be obtained by connecting these nodes. Further, since the road information includes heights above sea level, in addition to the coordinates of the respective points (nodes) on the road, the gradients of the road can be determined by continuously connecting these nodes.

Next, at step s430, the speed control basic function SCA-S determines the target speed Vcmd from the following formula (2) using a corrected speed Vcoast determined from the radius or curvature r. The corrected speed Vcoast is a correction component of a speed to reduce the speed in accordance with a radius of curvature of a road.

$$Vcmd = Vtmp - coast(r) \quad (2)$$

Next, at step s435 of FIG. 11, the speed control basic function SCA-S calculates the get torque tcmd from the target speed Vcmd and the one's own vehicle speed V0 using the following formula (3).

$$Tcmd = Kj \cdot \int (Vcmd - V0)dt + KQ \cdot V0 \quad (3)$$

where kj and kq are control constants, respectively and set to predetermined values.

Next, at step s440, the speed control basic function SCA-S compares predetermined torque Th with the target torque tcmd. When the target torque is larger than the predetermined torque, the process goes to step s455 and subsequent steps, whereas when the target torque is smaller, the process goes to step s455 and subsequent steps.

When the target torque is smaller, a brake must be applied, and target engine torque is transmitted to the engine controller EC shown in FIG. 1 at step s445. The content of transmission is target engine torque for setting the number of revolutions of an engine to the number of idle revolutions. The engine controller EC controls the engine according to the target engine torque.

Next, at step s440, the speed control basic function SCA-S transmits the target torque to the brake controller BC of FIG. 1. The content of transmission is torque which indicates how the brake is applied to cause the predetermined torque Tth to coincide with the target torque tcmd. The brake controller BC controls the application of the brake in accordance with the target torque.

In contrast, when the target torque is larger, the speed control basic function SCA-S calculates a present gear ratio n from the number of revolutions of the engine and the number of revolutions of a wheel at step s455.

Next, at step s460, the speed control basic function SCA-S determines whether or not a gear is being changed based on whether or not the calculated gear ratio n is the same as a predetermined gear ratio of a transmission mounted on the vehicle. When the gear is being changed, the process goes to step s485, whereas when the gear is not being changed, the process goes to step s465.

When the gear is not being changed, the speed control basic function SCA-S calculates the target numbers of revolutions of the engine when respective gears are employed using the gear ratios of the transmission mounted on the vehicle at step s465.

Next, at step s470, the speed control basic function SCA-S calculates the target torque when the respective gears are used.

Next, at step s475, the speed control basic function SCA-S searches engine heat efficiencies when the respective gears are employed from the target number of revolutions of the engine, the target engine torque, and an engine heat efficiency map. The speed control basic function SCA-S selects a gear ratio, the target number of revolution of the engine and target engine torque when the engine heat efficiency is optimized in the searched engine heat efficiencies. For example, in the example of the map at step s475 of FIG. 11, the engine heat efficiency is 20% at a first speed gear ratio and 30% at a second speed gear ratio, and thus a gear ratio is selected in accordance with an engine heat efficiency.

Next, at step s480, the speed control basic function SCA-S transmits the gear ratio to the transmission controller TC as a command value.

Next, at step s485, the speed control basic function SCA-S transmits the target engine torque to the engine controller EC as a command value. The engine controller EC controls the engine based on the received target engine torque. Note that when it determined at step s460 that the gear is being changed, no command is transmitted from a distance between vehicles controller because the engine controller is operated based on the command from the transmission controller. Then, operation at step s485 is executed.

Next, at step s490, the speed control basic function SCA-S transmits the command of the target torque (release of automatic brake in this case) to the brake controller.

While the traveling speed is controlled based on the information of the radius of curvature of the road information in the above explanation, the traveling speed may be controlled based on other road information. That is, as described above, the road information manager NA-R registers the road information to the shared object CO as well as refers to the road information from the shared object CO. Exemplified as the information registered to the shared object CO are road information such as the gradient and the radius of curvature of a road at a position where a vehicle exists, and the like, the position information of facilities and the static/dynamic information added to the position information, and supplementary information such as traffic jam information, recommended path information, and the like. The vehicle speed control application SCA can also control the traveling speed of the one's own vehicle referring to, for example, a gradient of the road information registered to the shared object CO.

Further, the navi-application NA analyzes a signal received through broadcasting or communication by means of the broadcast receiver 170 or the GPS receiver 160 and extracts road information as well as information added to the road information and registers the added information to the shared object CO. The vehicle speed control application SCA can control the traveling speed of the one's own vehicle based on the road information and the added information registered to the shared object CO. Further, the traveling speed of the one's own vehicle can also be controlled referring to the traveling environment information of the vicinity of the one's own vehicle registered to the shared object CO by the navi-application NA.

Further, while the combination of the ACC (vehicle speed control) and the car navigation has been described in the above description, the present invention can be applied to any combination of controls other than these two controls. For example, the present invention can be applied to a combination of at least two of 1) engine control (fuel control, throttle control and the like, ignition timing control, EGR control, and the like), 2) radar control (frequency control, FFT, tracking processing, and the like), 3) ACC control (vehicle speed control), 4) brake control (brake fluid pressure control), 5) AT control (solenoid ON/OFF, line pressure, gear ratio, and the like), 6) car navigation, 7) steering control (current, hydraulic pressure, steering torque, and the like), and 8) camera control (focal length, diaphragm, quantity of light, wavelength and the like).

As described above, this embodiment can provide the vehicle travel control apparatus which can realize the functions of a plurality of apparatuses only by itself, can set a vehicle speed based on road information without setting a communication task for sharing information and can provide a high grade drive support with a driver.

Further, the use of the shared object in the position information display device in which the plurality of operating systems operate on the singe processor permits the applications installed on the respective operating systems to asynchronously register road information and to asynchronously refer to the road information. Accordingly, applications which operate in association with each other using the road information between different operating systems can be easily developed. The introduction of the shared object can realize these functions, by which an easy-to-operate user interface can be provided.

Further, when road information is registered to or modified in the shared object from the application of one of the operating systems, the application of the other operating system is prohibited from registering road information to the shared object or from referring to the road information, which improves the reliability of the system by avoiding the reference to erroneous position information.

Then, when the road information is registered to or modified in the shared object from the application of the one of the operating systems, a message for notifying the registration and the reference of the road information is transmitted to the applications which operate on the plurality of operating systems, which improves the real time property that the road information can be instantly referred to in synchronism with the message as well as the above processing can be carried out with a minimum load on the processor.

Industrial Applicability

According to the present invention, the vehicle control apparatus makes it possible for the plurality of apparatuses to share information so as to improve controllability.

What is claimed is:

1. A vehicle travel control apparatus comprising a radar sensor, a vehicle speed controller, a hydraulic pump, a proportional solenoid valve and a brake controller, wherein, when said vehicle speed controller judges a situation of braking based on information of said radar sensor, said brake controller actuates said hydraulic pump and said proportional solenoid valve based on a command of said vehicle speed controller, and controls a braking torque of wheels.

2. A method of controlling a vehicle, the method comprising the acts of:

obtaining information from a radar sensor of the vehicle;

judging a braking situation with a vehicle speed controller based on the information of the radar sensor;

actuating with a brake controller a hydraulic pump and a proportional solenoid valve based on a command of the vehicle speed controller and controlling a braking torque of wheels of the vehicle.

3. A control system, comprising:

a vehicle having wheels;

a radar sensor arranged in the vehicle;

a vehicle speed controller of the vehicle;

a hydraulic pump of the vehicle;

a proportional solenoid valve of the vehicle;

a brake controller for controlling a braking torque of wheels of the vehicle; and wherein, when said vehicle speed controller judges a braking situation based on information from the radar sensor, said brake controller actuates the hydraulic pump and the proportional solenoid valve based on a command of the vehicle speed controller, and controls the braking torque of the wheels of the vehicle.

* * * * *